(12) United States Patent
Broussard et al.

(10) Patent No.: US 8,508,181 B2
(45) Date of Patent: Aug. 13, 2013

(54) ADJUSTABLE FREQUENCY DRIVE AND SYSTEM

(75) Inventors: Harry Broussard, Arden, NC (US); Melvin L. Hughes, Winterville, GA (US)

(73) Assignee: Eaton Corporation, Cleveland, OH (US)

( * ) Notice: Subject to any disclaimer, the term of this patent is extended or adjusted under 35 U.S.C. 154(b) by 638 days.

(21) Appl. No.: 12/494,629

(22) Filed: Jun. 30, 2009

(65) Prior Publication Data
US 2010/0327799 A1    Dec. 30, 2010

(51) Int. Cl.
*H02P 23/00* (2006.01)
*H02P 25/00* (2006.01)
*H02P 27/00* (2006.01)

(52) U.S. Cl.
USPC ........ 318/807; 318/400.3; 318/780; 318/800; 318/801; 361/603; 361/623; 361/699; 361/701

(58) Field of Classification Search
USPC ...... 318/807, 400.3, 780, 800, 801; 361/603, 361/623, 699, 701
See application file for complete search history.

(56) References Cited

U.S. PATENT DOCUMENTS

| | | | |
|---|---|---|---|
| 6,679,076 B1 | 1/2004 | Duga et al. | |
| 6,822,866 B2* | 11/2004 | Fearing et al. | 361/701 |
| 7,110,272 B2 | 9/2006 | Nojima | |
| 7,353,662 B2 | 4/2008 | Norbeck | |
| 7,640,767 B2* | 1/2010 | Schnetzka et al. | 62/434 |
| 2006/0197491 A1 | 9/2006 | Nojima | |
| 2006/0250105 A1* | 11/2006 | Jadric et al. | 318/701 |

* cited by examiner

*Primary Examiner* — Erick Glass
(74) *Attorney, Agent, or Firm* — Eckert Seamans Cherin & Mellott, LLC; Kirk D. Houser

(57) ABSTRACT

An adjustable frequency drive includes a base having a first portion and a second portion, and an active front end converter disposed on the base. The converter includes an input, an output, and a plurality of first electronic switches electrically connected between the input and the output. An inverter is disposed on the base and includes an input electrically connected to the output of the active front end converter, an output, a plurality of capacitors disposed on the first portion of the base and electrically connected to the input of the inverter, a plurality of second electronic switches disposed on the second portion of the base and electrically connected between the input and the output of the inverter, and a heat pipe assembly. The inverter is structured to provide a single, three-phase output structure.

19 Claims, 8 Drawing Sheets

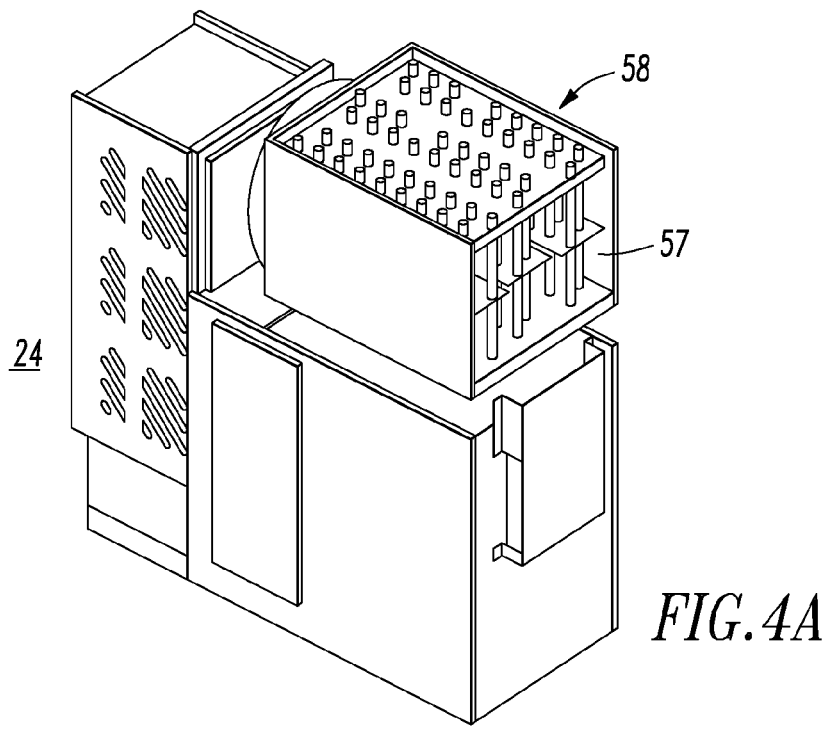
FIG.4A
FIG.4B
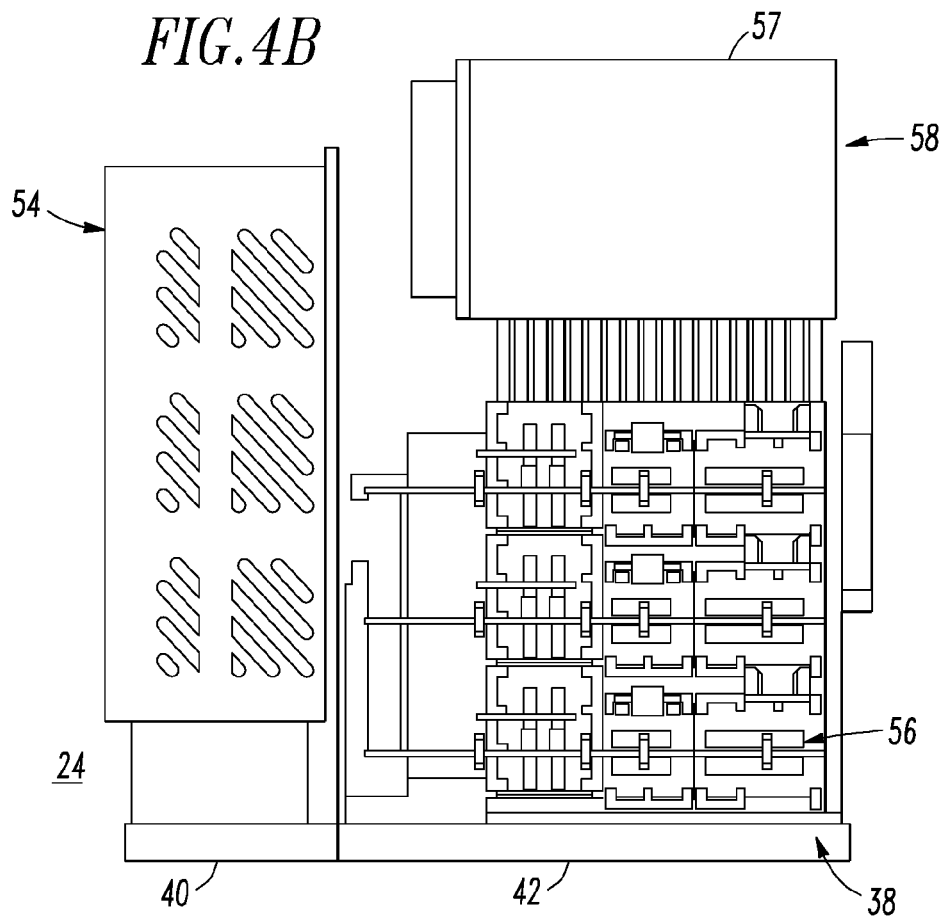

ADJUSTABLE FREQUENCY DRIVE AND SYSTEM

BACKGROUND

1. Field

The disclosed concept pertains generally to adjustable frequency drive (AFD) systems and, more particularly, to such AFD systems, which control the speed, torque, horsepower and/or direction of an induction machine or other rotating electrical apparatus, such as, for example, an AC motor or generator. The disclosed concept also pertains to AFD structures for power conversion in generation applications.

2. Background Information

An adjustable frequency drive (AFD) system can be employed in a wide range of commercial applications, such as, for example and without limitation, HVAC, fans, pumps, conveyors, material handling and processing equipment, and other general industries, such as, for example and without limitation, forest products, mining, metals and printing.

If the stator terminals of an induction machine are connected to a three-phase AFD system, then the rotor will rotate in the direction of the stator rotating magnetic field. This is the induction machine motoring mode of operation. When load torque is applied to the motor shaft, the steady state speed is less than the synchronous speed.

When the induction machine speed is higher than the synchronous speed, and the induction machine rotates in the same direction as the stator rotating field, the induction machine is in the generating mode of operation. Here, a generating torque acting opposite to the stator rotating magnetic field is produced.

Under known practices, medium voltage drives are remotely mounted separate from rotating electrical apparatus. This requires significant floor space and, sometimes, relatively long lengths of shielded power cables and output filters.

U.S. Pat. No. 6,679,076 discloses that a centrifugal chiller includes both a unit-mounted full-voltage starter and a unit-mounted reduced-voltage starter. The full-voltage starter enclosure is placed in a location that is accessible to a user, adjacent to the motor leads, and convenient for feeding the main power supply lines to the chiller. The full-voltage starter is an electromagnetic on/off switch whose operation determines whether the entire supply line-voltage (e.g., 2,300 volts) or zero voltage is made available to the motor. The reduced-voltage starter can be a primary reactor, an autotransformer, or a solid-state starter. A primary reactor includes a resistor in series with each power line leading to the motor. A set of contacts serves as a shunt across each resistor to effectively add or remove the resistor from its respective line. An autotransformer includes a transformer with multiple leads that a set of contacts selectively taps to apply full-voltage or reduced-voltage across the motor leads. A solid-state starter includes at least one solid-state electrical "switching" device (e.g., SCR, triac, diac, power transistor, etc.) that interrupts or changes the waveform of the power leading to the motor to deliver less power to the motor at startup, and full power afterwards.

U.S. Pat. No. 7,353,662 discloses that a starter box can be replaced with a variable speed drive configured for operation at medium voltage in order to operate a motor at variable speeds, and that the starter box or the variable speed drive is preferably mounted on a chiller system unit with the other components of a chiller system. A solid-state starter device is preferably used to "soft start" the motor on an initial startup of the motor and then to permit operation of the motor at a fixed speed after startup. The solid-state starter device can preferably incorporate semiconductor switches such as silicon controlled rectifiers (SCRs), insulated gate bipolar transistors (IGBTs), diodes or gate turn off (GTO) devices.

FIG. 1A shows a conventional industrial AFD 2 (e.g., 92" in height) including an input section 4, a transformer and converter section 6, and an inverter section 8. The input section 4 includes an isolation switch (not shown), power fuses (not shown) and a contactor (not shown). The transformer and converter section 6 includes a transformer (not shown) and a converter (not shown). As shown in FIG. 1B, the inverter section 8 includes lower DC link capacitors 10, an intermediate electronic switch (e.g., without limitation, semiconductor switches, such as IGBTs) sub-section 12 above the capacitors 10, and a condenser section of a heat pipe assembly 14 above the intermediate electronic switch sub-section 12.

It is known to provide individual components, such as DC link capacitors, electronic switches, discharge resistors and rectifier diodes, and heat pipe assemblies.

It is also known to mount an input section for an AFD in an enclosure separate from a starter.

Induction motor drives, also called alternating current (AC) drives, are used to control the speed and torque of multiphase induction motors, which for a long time have been the workhorse of the industry.

Today's AC drives can be divided into two categories: low voltage and medium voltage. The low voltage AC drives are widely used and cover the 0 VAC to 600 VAC range. Medium voltage AC drives cover input line voltages above 660 VAC and up to 15,000 VAC. High voltage AC drives cover voltages of 15,000 VAC and higher, but are very uncommon compared to low voltage and medium voltage AC drives.

Until recently, power semiconductor switches were rated at a maximum of 1,700 V, which has allowed the low voltage three-phase AC drives to use a six-switch inverter bridge. Today, state-of-the-art semiconductor switches are rated at 2,500 V, 3,300 V, 4,500 V, 6,500 V and can be used in a two-level six-switch inverter bridge having up to a 2,000 VAC input. Above 2,000 VAC, known inverter bridges employ a greater number of power semiconductor switches connected in series. The most popular inverter topology for three-phase medium voltage induction motors of up to 4,000 V is a three-level twelve-switch inverter bridge.

The number of levels in an inverter bridge defines the number of direct current (DC) voltage steps that are employed by the inverter bridge in order to achieve a certain voltage level in its output. Because power semiconductor switches have limited voltage capability, the total DC bus voltage of an inverter bridge is divided into a number of voltage steps, such that each voltage step can be handled by one power switch.

In a conventional two-level AC drive, three-phase AC power (R, S, T), after passing through an optional input line reactor, is rectified by a rectifier and a capacitor to form a two-level DC bus. Depending on the design approach, input harmonics on the DC bus may be further reduced by a DC reactor. The two-level DC bus voltage is applied across the six-switch inverter bridge which produces a two-level PWM voltage output.

The six switches are divided into three branches with two switches each. A controller controls each switch via the control terminals of the corresponding switch. A three-phase motor has a phase connection derived from the middle point between two switches of a branch, and the three branches produce three phases which collectively drive the motor.

The two-levels of the DC bus constitute a positive bus and a negative bus. The top switch of each branch is connected to the positive bus and the bottom switch is tied to the negative bus. The two switches in a branch are in series and therefore cannot be turned-on at the same time without causing a short-circuit. In order to prevent short-circuit, switch delay times must be taken into consideration by the controller. The top switch needs to turn-off before the bottom one turns-on, and vice-versa. Each of the switches handles the full voltage between the positive and negative busses.

A three-phase inverter bridge has three branches and "L" bus voltage levels (L≧2). Each branch provides one phase of the three-phase output for driving an inductive load. See, for example, U.S. Pat. No. 7,110,272.

An active front end (AFE) converter and an LCL (inductor/capacitor/inductor) filter are known structures.

There is room for improvement in adjustable frequency drives.

There is also room for improvement in packaging of adjustable frequency drive structures.

There is further room for improvement in adjustable frequency drive systems.

SUMMARY

These needs and others are met by embodiments of the disclosed concept, which provide an adjustable frequency drive that allows, for example and without limitation, direct mounting on a standalone rotating electrical apparatus or any other load capable of being driven by an adjustable frequency drive, or in the case of a generator, feeding an adjustable frequency drive. For example, this minimizes the floor space and interconnect cabling employed for installation of the adjustable frequency drive. Furthermore, the example direct mounting virtually eliminates the need for any type of output filtering due to the relatively small length of the interconnect cabling and, also, reduces installation and startup costs.

In accordance with one aspect of the disclosed concept, an adjustable frequency drive comprises: a base including a first portion and a second portion; an active front end converter disposed on the base, the active front end converter comprising: an input, an output, and a plurality of first electronic switches electrically connected between the input and the output; and an inverter disposed on the base, the inverter comprising: an input electrically connected to the output of the active front end converter, an output, a plurality of capacitors disposed on the first portion of the base and electrically connected to the input of the inverter, a plurality of second electronic switches disposed on the second portion of the base and electrically connected between the input and the output of the inverter, and a heat pipe assembly, wherein the inverter is structured to provide a single, three-phase output structure.

The plurality of capacitors may be disposed beside the plurality of second electronic switches, in order to reduce the height of the adjustable frequency drive.

The height of the adjustable frequency drive may be less than about 55 inches.

The adjustable frequency drive may provide a low profile structure.

The input of the active front end converter may be structured to receive a medium voltage.

As another aspect of the disclosed concept, an adjustable frequency drive comprises: a base including a first portion and a second portion; a converter disposed on the base, the converter comprising: an input, an output, and a plurality of rectifiers disposed between the input and the output; and an inverter disposed on the base, the inverter comprising: an input electrically connected to the output of the converter, an output, a plurality of capacitors disposed on the first portion of the base and electrically connected to the input of the inverter, a plurality of electronic switches disposed on the second portion of the base and electrically connected between the input and the output of the inverter, and a heat pipe assembly, wherein the inverter is structured to provide a single, three-phase output structure.

The plurality of capacitors may be disposed beside the plurality of electronic switches, in order to reduce the height of the adjustable frequency drive.

The height of the adjustable frequency drive may be less than about 55 inches.

The adjustable frequency drive may provide a low profile structure.

The input of the converter may be structured to receive a medium voltage.

As another aspect of the invention, a system comprises: a rotating electrical apparatus; and an adjustable frequency drive integrally mounted with the rotating electrical apparatus, the adjustable frequency drive comprising: a base including a first portion and a second portion, an active front end converter disposed on the base, the active front end converter comprising: an input, an output, and a plurality of first electronic switches electrically connected between the input and the output, and an inverter disposed on the base, the inverter comprising: an input electrically connected to the output of the active front end converter, an output, a plurality of capacitors disposed on the first portion of the base and electrically connected to the input of the inverter, a plurality of second electronic switches disposed on the second portion of the base and electrically connected between the input and the output of the inverter, and a heat pipe assembly, wherein the inverter is structured to provide a single, three-phase output structure.

As another aspect of the invention, a system comprises: a rotating electrical apparatus; and an adjustable frequency drive integrally mounted with the rotating electrical apparatus, the adjustable frequency drive comprising: a base including a first portion and a second portion, a converter disposed on the base, the converter comprising: an input, an output, and a plurality of rectifiers disposed between the input and the output, and an inverter disposed on the base, the inverter comprising: an input electrically connected to the output of the converter, an output, a plurality of capacitors disposed on the first portion of the base and electrically connected to the input of the inverter, a plurality of electronic switches disposed on the second portion of the base and electrically connected between the input and the output of the inverter, and a heat pipe assembly, wherein the inverter is structured to provide a single, three-phase output structure.

As another aspect of the invention, an inverter comprises: a base including a first portion and a second portion; an input structured to receive a direct current voltage; an output; a plurality of capacitors disposed on the first portion of the base and electrically connected to the input; and a plurality of electronic switches disposed on the second portion of the base and electrically connected between the input and the output, wherein the inverter is structured to provide a single, three-phase output structure.

As another aspect of the invention, a converter comprises: a base including a first portion and a second portion; an input structured to receive an alternating current voltage; an output; a plurality of capacitors disposed on the first portion of the base and electrically connected to the output; and a plurality of rectifiers disposed on the second portion of the base and electrically connected between the input and the output.

As another aspect of the invention, an active front end converter comprises: a base including a first portion and a second portion; an input structured to receive an alternating current voltage; an output; a plurality of capacitors disposed on the first portion of the base and electrically connected to the output; and a plurality of electronic switches disposed on the second portion of the base and electrically connected between the input and the output, wherein the active front end converter is structured to provide a single, three-phase output structure.

BRIEF DESCRIPTION OF THE DRAWINGS

A full understanding of the disclosed concept can be gained from the following description of the preferred embodiments when read in conjunction with the accompanying drawings in which:

FIGS. 4A and 4B are isometric and side vertical elevation views, respectively, of the inverter of FIG. 2A.

DESCRIPTION OF THE PREFERRED EMBODIMENTS

As employed herein, the term "number" shall mean one or an integer greater than one (i.e., a plurality).

As employed herein, the term "low voltage" shall mean any voltage that is less than about 600 $V_{RMS}$.

As employed herein, the term "medium voltage" shall mean any voltage greater than a low voltage and in the range from about 600 $V_{RMS}$ to about 15 $kV_{RMS}$.

As employed herein, the term "low profile" shall mean that the height of an adjustable frequency drive (AFD) is less than about 55 inches.

As employed herein, the term "rotating electrical apparatus" shall expressly include, but not be limited to, motors; generators; HVAC chillers; compressors; induction machines; and generators or motors with multiple independent windings on a common shaft and capable of being independently controlled.

As employed herein, the term "integrally mounted" shall mean that an adjustable frequency drive (AFD) is mounted together with a rotating electrical apparatus, in order to, for example and without limitation, reduce floor space and/or relatively long lengths of shielded power cables and output filters.

As employed herein, the term "converter" shall mean an apparatus or device that converts electrical energy from an alternating current form to a direct current form. Non-limiting examples of converters are rectifiers, such as diode rectifiers, and full wave rectifiers, such as full wave diode rectifiers. A rectifier is an electrical device that converts alternating current to direct current, a process known as rectification. Rectifiers can be made of, for example and without limitation, solid state diodes, vacuum tube diodes, mercury arc valves and other components.

As employed herein, the term "inverter" shall mean an apparatus or device that converts electrical energy from a direct current form to an alternating current form. A non-limiting example of an inverter is a three-phase inverter as employed, for example, by an AFD. The example three-phase inverter includes three single-phase inverter arms/branches, each connected to one of three load terminals. For example and without limitation, the operation of the three inverter arms/branches is coordinated so that one arm/branch operates at each 120 degree point of a fundamental output waveform.

As employed herein, the term "active front end converter" shall mean a converter that employs electronic switches (e.g., without limitation, semiconductor switches, such as IGBTs) as rectifiers instead of a transformer and a diode rectifier or a full wave rectifier.

The disclosed concept is described in association with medium voltage adjustable frequency drives, although the disclosed concept is applicable to a wide range of adjustable frequency drives.

Figure 1A:
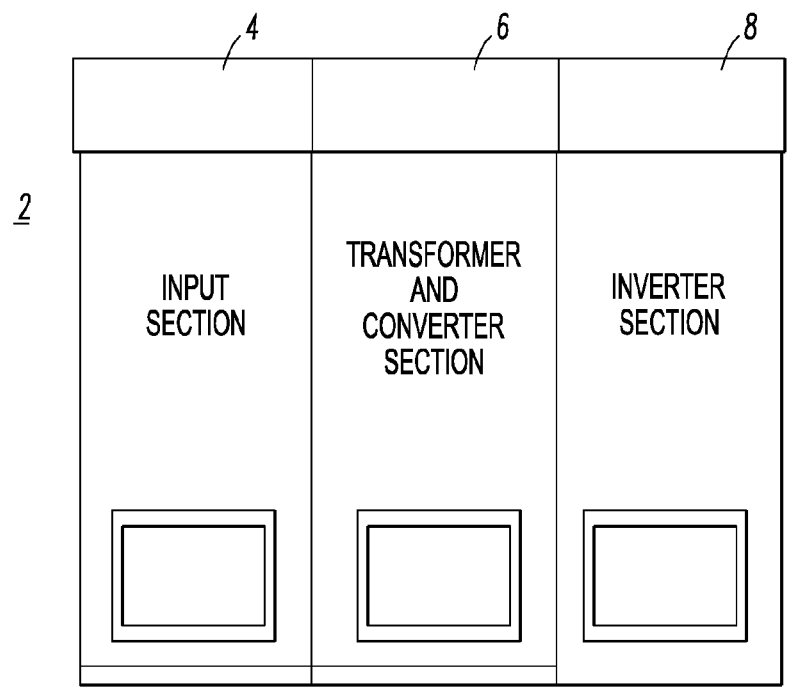
FIG. 1A is a simplified vertical elevation view of an industrial adjustable frequency drive including an input section, a transformer and converter section, and an inverter section.
Figure 1B:
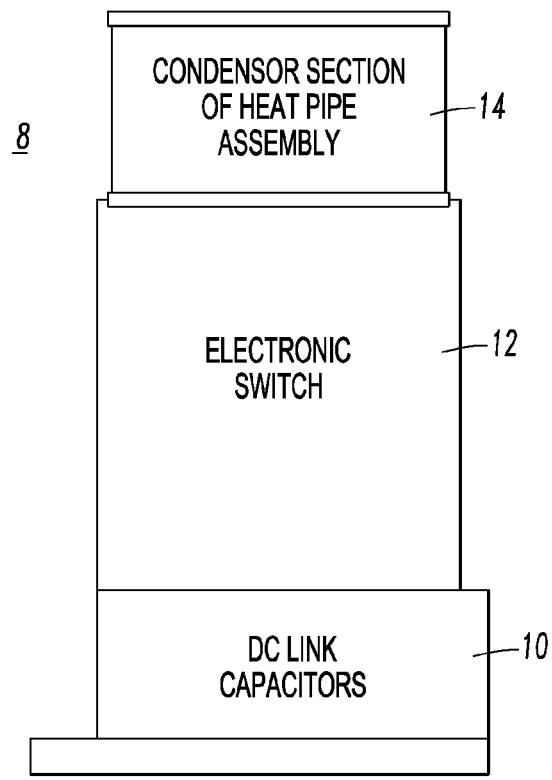
FIG. 1B is a side elevation view of the inverter section of FIG. 1A, which includes lower DC link capacitors, an intermediate electronic switch sub-section, and an upper condenser section of a heat pipe assembly.
Figure 2A:
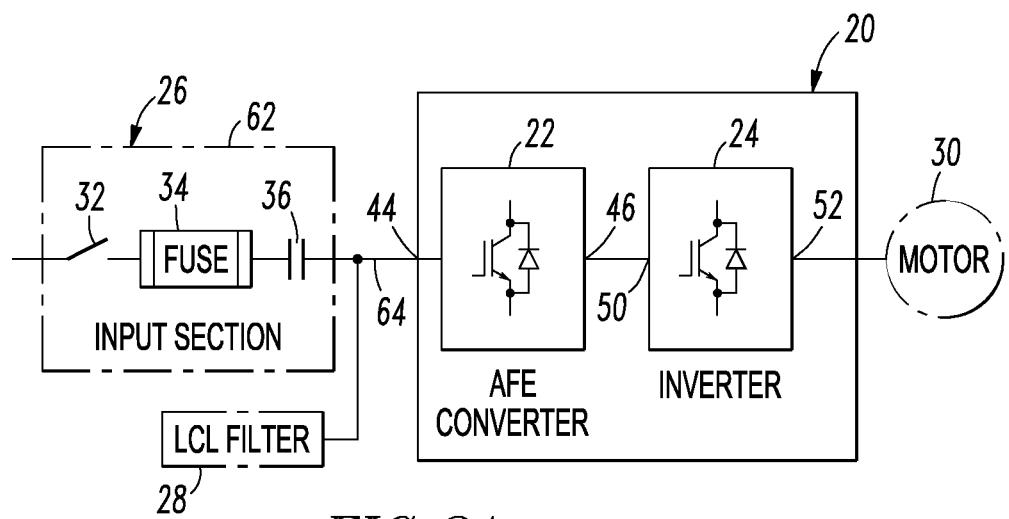
FIG. 2A is a simplified block diagram of an adjustable frequency drive including an active front end (AFE) converter and an inverter in accordance with embodiments of the disclosed concept.

FIG. 2A shows a simplified, one-line view of an adjustable frequency drive (AFD) 20 including an active front end (AFE) converter 22 and an inverter 24. The AFD 20 has an active front end and uses the example AFE converter 22 instead of a transformer. An input section 26 (shown in phantom line drawing) and an LCL filter 28 (shown in phantom line drawing) are remotely mounted upstream of the AFE converter 22. The AFD 20 powers a downstream motor 30 (shown in phantom line drawing). The input section 26 can include, for example and without limitation, the series electrical combination, for each phase (only one example phase is shown), of a suitable input isolation switch 32, a power fuse 34, and an input contactor 36. The AFE converter 22 is structured to provide a single, three-phase output structure.

Figure 2B:
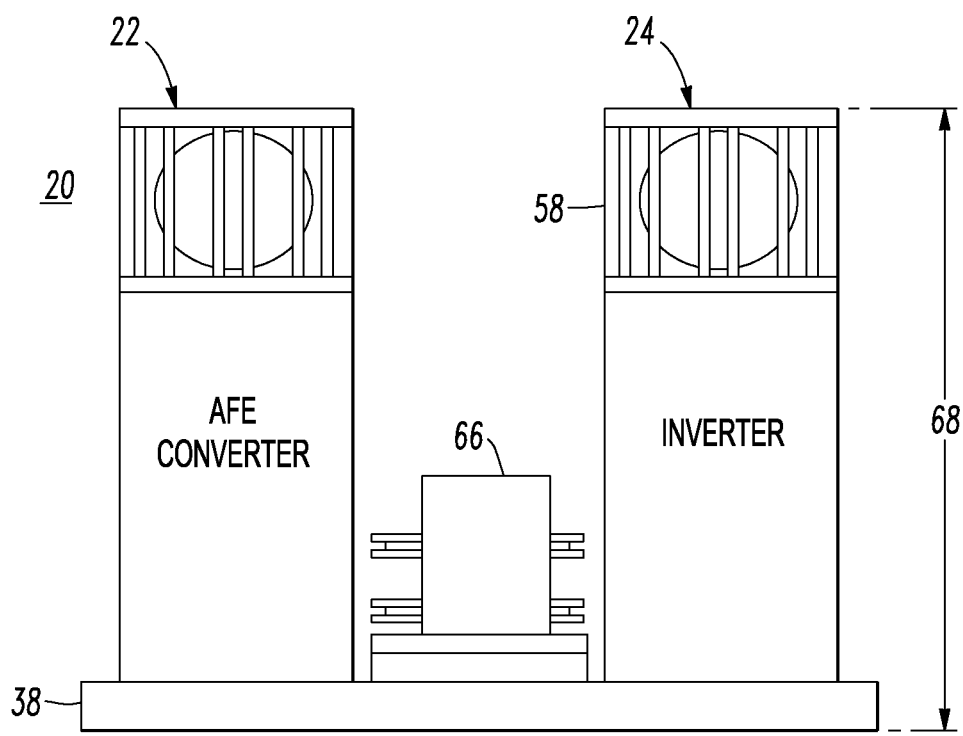
FIG. 2B is a simplified vertical elevation view of the adjustable frequency drive of FIG. 2A.
Figure 5:
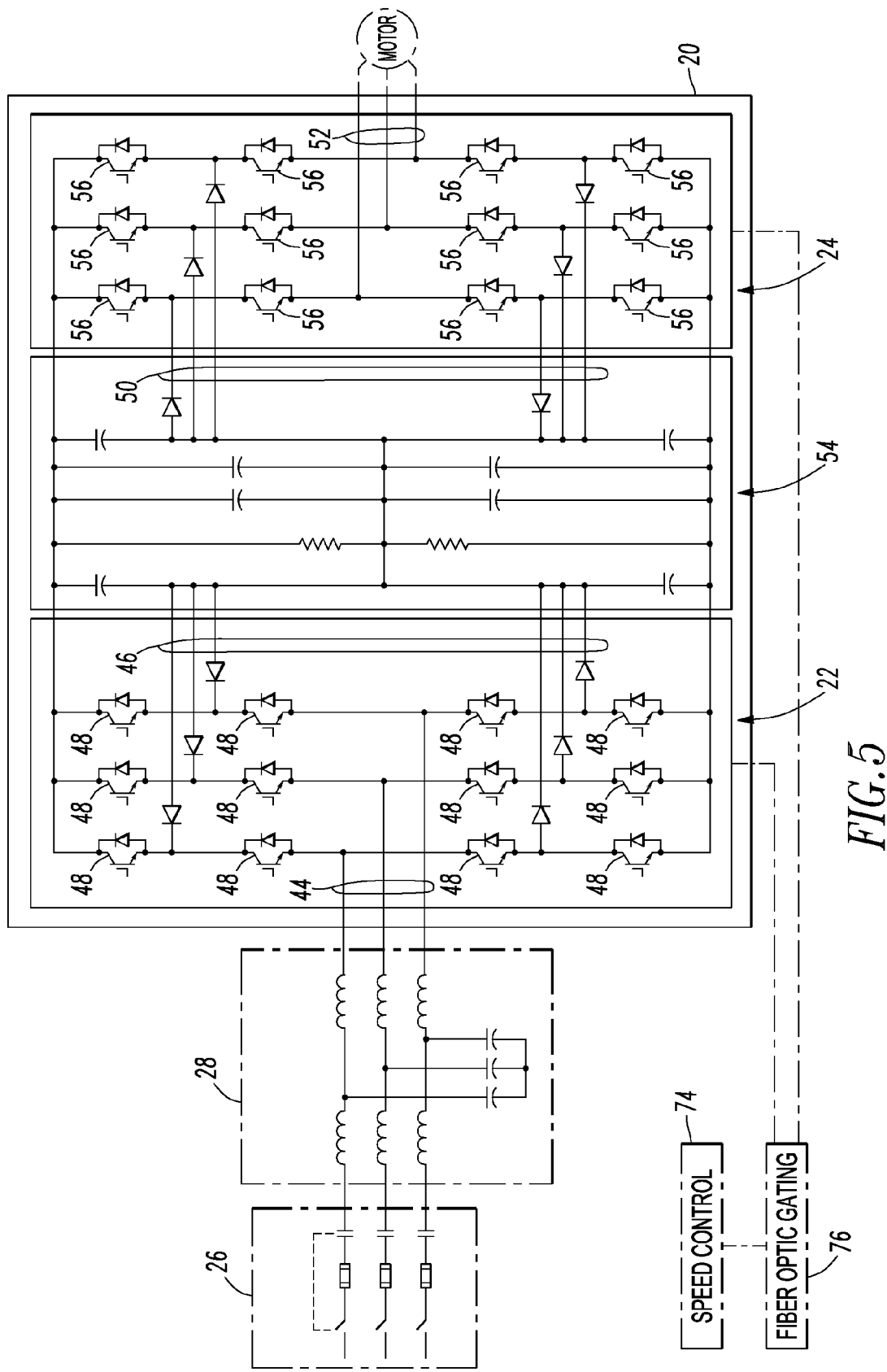
FIG. 5 is a more detailed block diagram of the adjustable frequency drive of FIG. 2A.

Referring to FIGS. 2B, 3, 4A, 4B and 5, the AFD 20 includes a base 38 having a first portion 40 (as shown in FIG. 4B) and a second portion 42 (as shown in FIG. 4B). The AFE converter 22 (FIG. 2B) is disposed on the base 38 and includes an input 44, an output 46, and a plurality of first electronic switches (e.g., without limitation, IGBTs) 48 (FIG. 5) electrically connected between the input 44 and the output 46. Preferably, the AFD 20 is slightly elevated and cantilevered from the end of the example chiller 70. Hence, reduced height of the AFD 20 is advantageous. The LCL filter 28 (shown in phantom line drawing in FIG. 5) is electrically connected to and mounted remote from the input 44 of the AFE converter 22. The inverter 24 is also disposed on the base 38 (FIGS. 2B and 4B) and includes an input 50 electrically connected to the output 46 of the AFE converter 22, an output 52, a plurality of DC link capacitors 54 (FIGS. 4B and 5) disposed on the first portion 40 of the base 38 (FIG. 4B) and electrically connected to the input 50 of the inverter 24 (FIG. 5), a plurality of second electronic switches (e.g., without limitation, IGBTs) 56 disposed on the second portion 42 of the base 38 (FIG. 4B) and electrically connected between the input 50 and the output 52 of the inverter 24, and a heat pipe assembly 58 (FIGS. 2B and 4B). The inverter 24 is structured to provide a single, three-phase output structure, as best shown in FIG. 5.

Referring again to FIG. 2A, the input section 26 (shown in phantom line drawing) is electrically connected to the input 44 of the AFE converter 22. The input section 26 is preferably mounted in an enclosure 62 (shown in phantom line drawing) remote from the AFD 20. The input 44 of the AFE converter 22 is preferably structured to receive a medium voltage 64.

As shown in FIG. 2B, the AFD 20 can optionally include a suitable pre-charge circuit 66 for the DC link capacitors 54 (FIG. 4B). Although not required, preferably, the height 68 of the AFD 20 is less than about 55 inches. As another alternative option, the AFD 20 can provide a low profile structure where the height 68 is less than about 55 inches.

Figure 3:
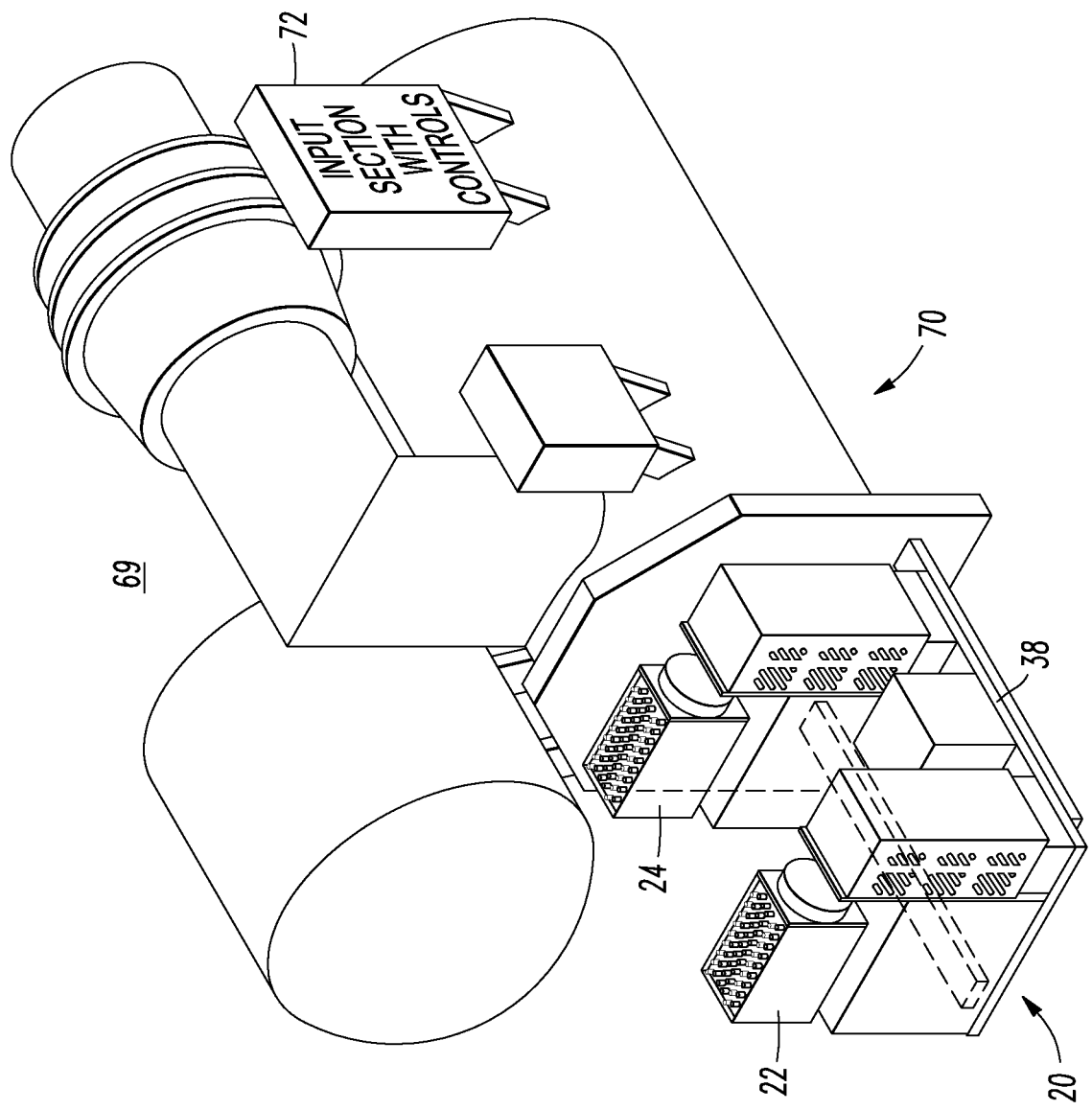
FIG. 3 is an isometric view of a system including a rotating electrical apparatus, such as a chiller, an input section, and the adjustable frequency drive of FIG. 2B.

FIG. 3 shows a system 69 including a rotating electrical apparatus, such as an example chiller 70, an input section 72, which provides primary protection, and the AFD 20 of FIG. 2B. It is believed that mounting such a separate input section 72 in a separate enclosure 62 (FIG. 2A) remote from a drive, such as the example AFD 20, is novel and non-obvious.

FIGS. 4A and 4B show the inverter 24 of FIG. 2A. The inverter 24 has three sections: (1) the DC link capacitors 54 are located on the first potion 40 of the base 38; (2) the electronic switches 56 are located on the second portion 42 of the base 38 and beside the capacitors 54; and (3) a condenser section 57 of the heat pipe assembly 58 is located above the electronic switches 56. It is believed that the disclosed packaging for these components is novel and non-obvious. In accordance with important aspects of the disclosed concept, the inverter 24 provides a single, three-phase output structure as contrasted with providing three separate single-phase inverters (not shown), and the DC link capacitors 54 are moved to one side (e.g., to the left with respect to FIG. 4B) beside the electronic switches 56, in order to reduce the height of the inverter 24 and, thus, reduce the height 68 of the AFD 20 as shown in FIG. 2B.

Referring to FIG. 5, there is a conventional speed control function 74 (shown in phantom line drawing) and a conventional fiber optic gating control 76 (shown in phantom line drawing). Both of the conventional speed control function 74 and the conventional fiber optic gating control 76 can be locally mounted (not shown) with the AFD 20 or can be remotely mounted (as shown in FIG. 5).

Referring to FIGS. 6-9, another AFD 80 is shown. The example AFD 80 is non-integrated, and an input section 82 and a transformer 84 (e.g., without limitation, a 24-pulse, phase shifting/isolating transformer) are both mounted remotely. The AFD 80 powers a motor 86 (shown in phantom line drawing). The input section 82 can include, for example and without limitation, the series electrical combination, for each phase (only one phase is shown), of a suitable input isolation switch 88, a power fuse 90, and an input contactor 92. The input section 82 is electrically connected to the primary of the transformer 84 and is mounted remote from the input 104 of the converter 100.

Figure 6:
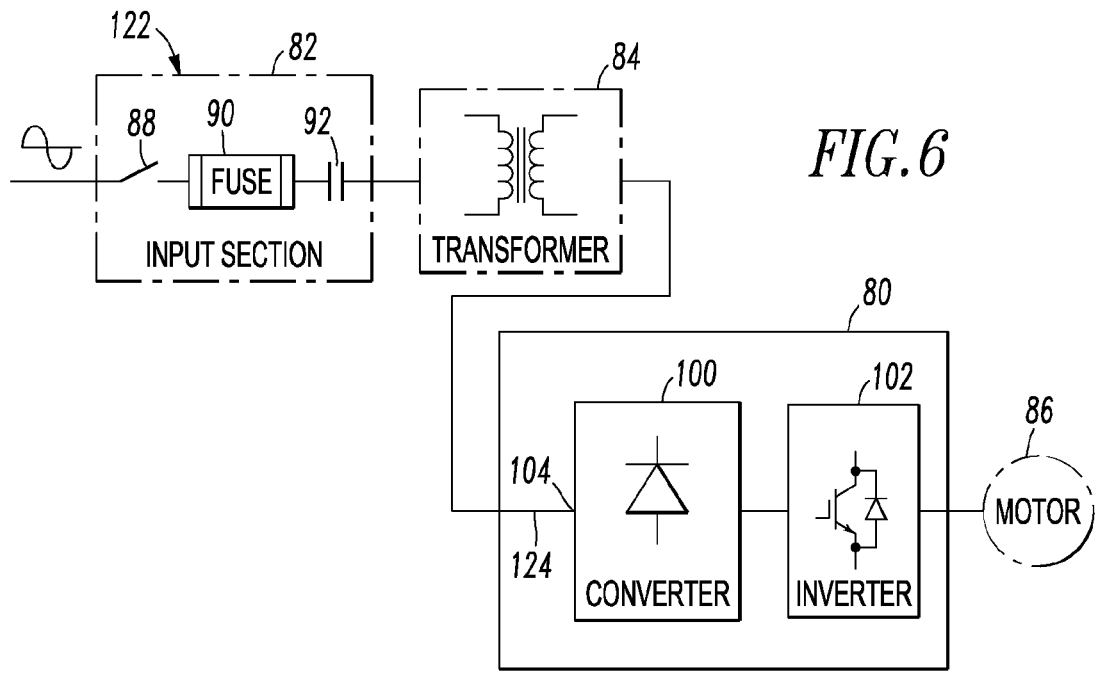
FIG. 6 is a simplified block diagram of a non-integrated adjustable frequency drive including a converter and an inverter in accordance with other embodiments of the disclosed concept.
Figure 8:
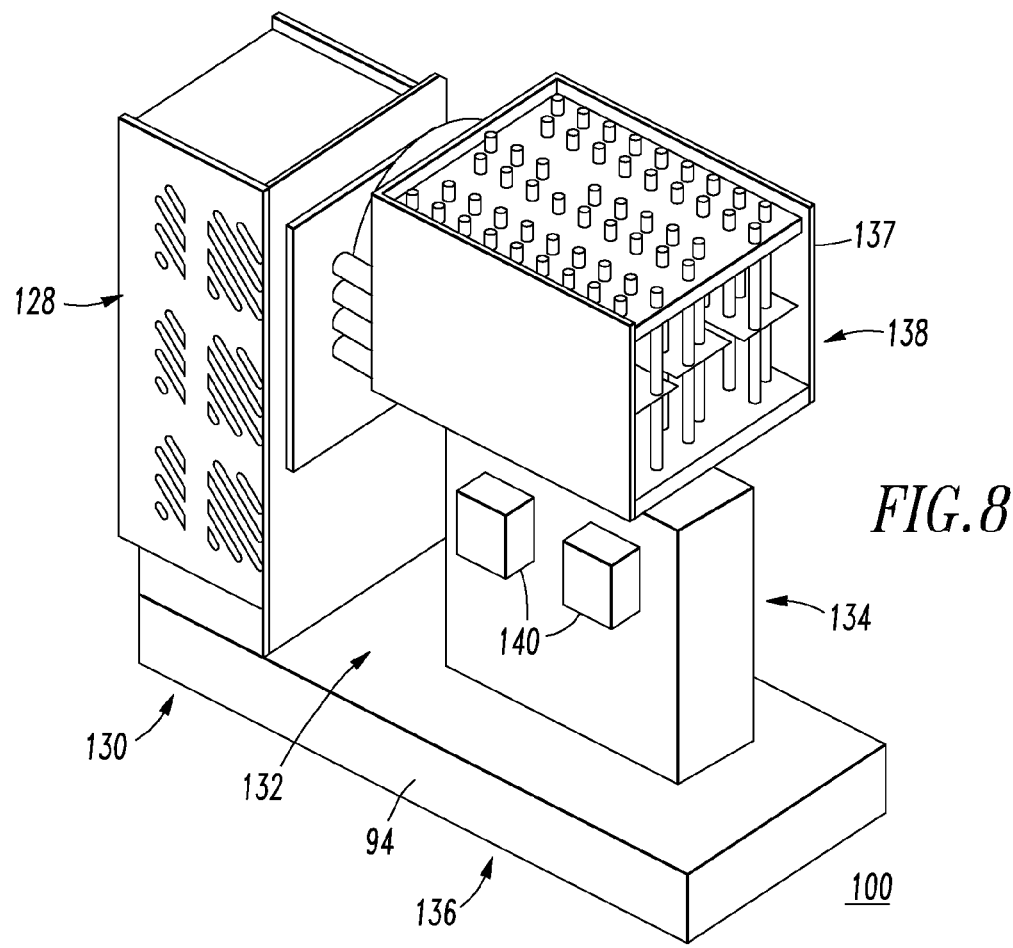
FIG. 8 is an isometric view of the converter of FIG. 6.
Figure 7:
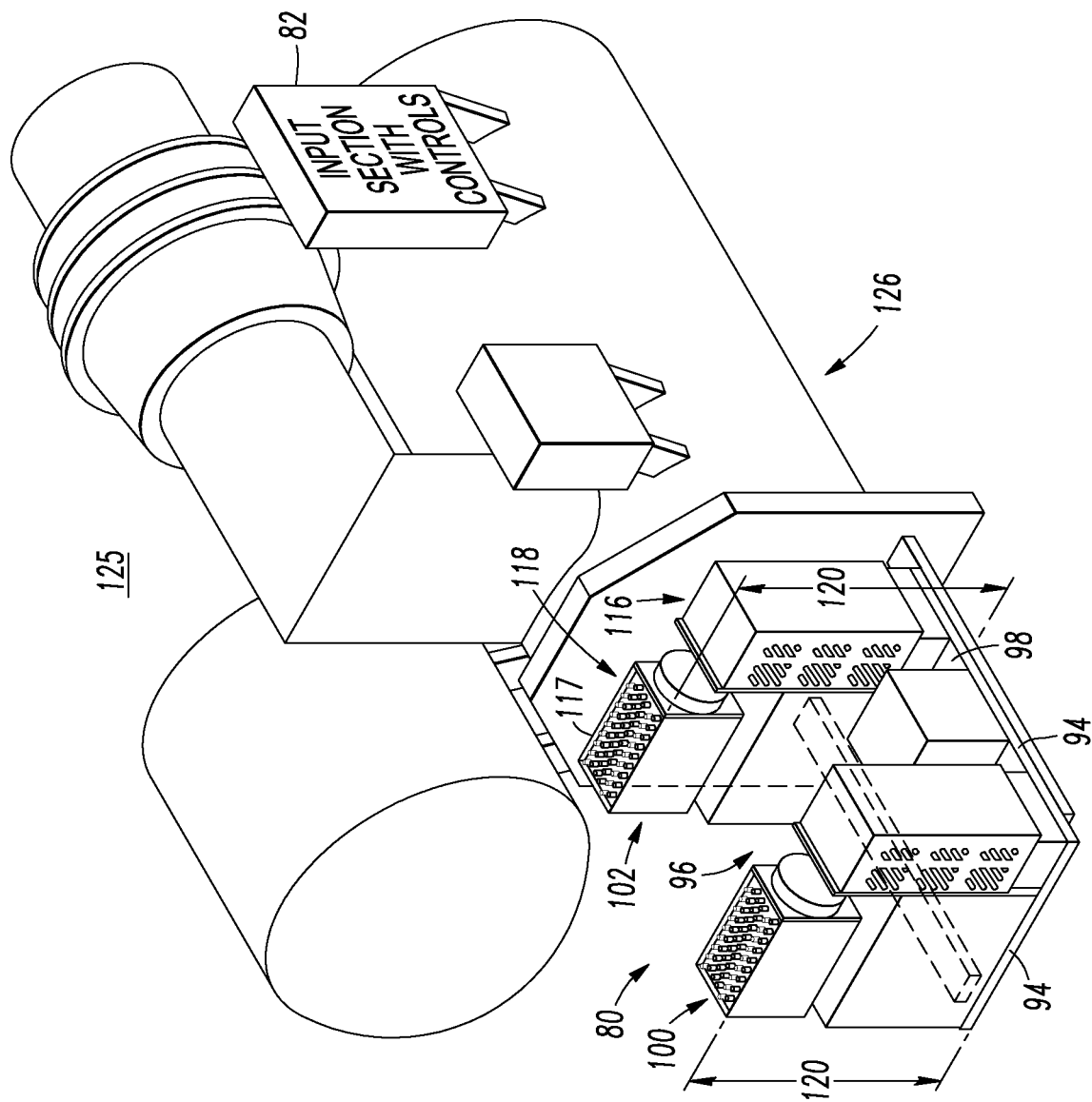
FIG. 7 is an isometric view of a system including a rotating electrical apparatus, such as a chiller, an input section, and the adjustable frequency drive of FIG. 6.
Figure 9:
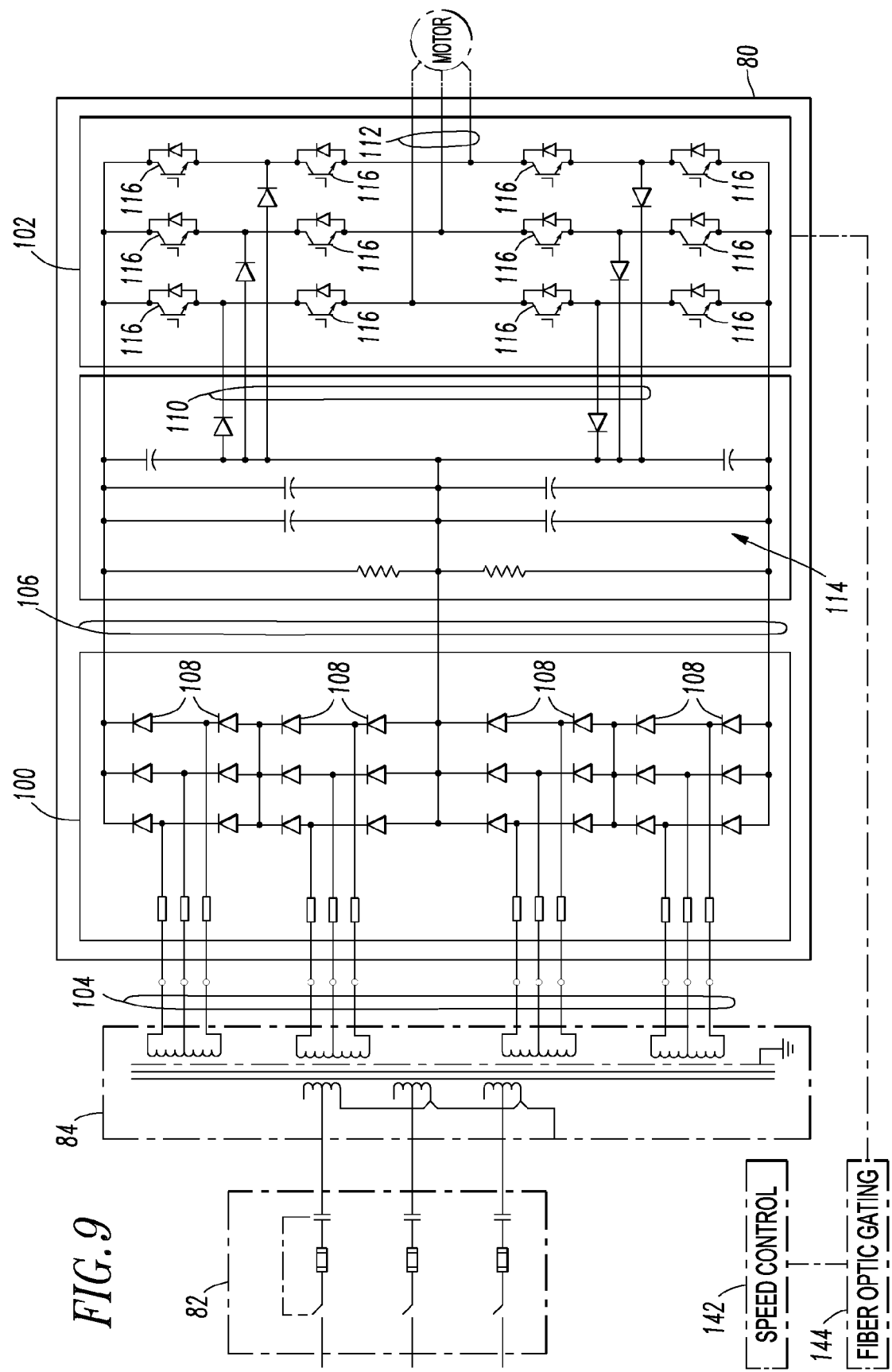
FIG. 9 is a more detailed block diagram of the adjustable frequency drive of FIG. 6.

As shown in FIGS. 6-9, the AFD 80 includes a base 94 (FIG. 7) having a first portion 96 (not directly shown, but see the first portion 40 of the base 38 of FIG. 4B) and a second portion 98, a converter 100 disposed on the base 94 and an inverter 102 disposed on the base 94. The converter 100 (FIG. 9) includes an input 104, an output 106, and a plurality of rectifiers 108 disposed between the input 104 and the output 106. The inverter 102 includes an input 110 electrically connected to the output 106 of the converter 100, an output 112, and a plurality of DC link capacitors 114 disposed on the first portion 96 of the base 94 and electrically connected to the input 110 of the inverter 102. A plurality of electronic switches (e.g., without limitation, IGBTs) 116 are disposed on the second portion 98 of the base 94 and are electrically connected between the input 110 and the output 112 of the inverter 102. A condenser section 117 of a heat pipe assembly 118 (FIG. 7) is disposed above the electronic switches 116 (FIGS. 7 and 9). The inverter 102 can be the same as or similar to the inverter 24 of FIGS. 2A, 2B, 3, 4A, 4B and 5. Alternatively, any suitable inverter structured to provide a single, three-phase output structure can be employed.

Preferably, the height 120 (FIG. 7) of the AFD 80 is less than about 55 inches. Alternatively, where desired, the AFD 80 can provide a low profile structure where the height 120 is less than about 52 inches.

The input section 82 (FIGS. 6 and 7) is preferably mounted in an enclosure 122 (shown in phantom line drawing) remote from the AFD 80. The transformer 84 is electrically interconnected with and mounted remote from the input 104 of the converter 100. The input 104 of the converter 100 is preferably structured to receive a medium voltage 124.

FIG. 7 shows a system 125 including a rotating electrical apparatus, such as an example chiller 126, the input section 82, which provides primary protection, and the AFD 80 of FIGS. 6 and 9. Preferably, the AFD 80 is slightly elevated and cantilevered from the end of the example chiller 126. Hence, reduced height of the AFD 80 is advantageous. It is believed that mounting such a separate input section 82 in a separate enclosure 122 (FIG. 6) remote from a drive, such as the AFD 80, is novel and non-obvious. The transformer 84 (FIG. 6) is not shown in FIG. 7.

FIG. 8 shows the converter 100 of FIG. 6. The converter 100 includes DC link capacitors 128 on the one side 130, discharge resistors 132 and rectifier diodes 134 on the other side 136 and beside the capacitors 128, and a condenser section 137 of a heat pipe assembly 138 above the discharge resistors 132 and the rectifier diodes 134. Two voltage sensors 140 are employed to sense the positive and negative direct current output voltages at the output 106 (FIG. 9) of the converter 100.

Referring to FIG. 9, there is a conventional speed control function 142 (shown in phantom line drawing) and a conventional fiber optic gating control 144 (shown in phantom line drawing). Both of the conventional speed control function 142 and the conventional fiber optic gating control 144 can be locally mounted (not shown) with the AFD 80 or can be remotely mounted (as shown in FIG. 9).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. An adjustable frequency drive comprising:
 a base including a first portion and a second portion;
 an active front end converter disposed on said base, said active front end converter comprising:
  an input,
  an output, and
  a plurality of first electronic switches electrically connected between said input and said output; and
 an inverter disposed on said base, said inverter comprising:

an input electrically connected to the output of said
   active front end converter,
an output,
a plurality of capacitors disposed on the first portion of
   said base and electrically connected to the input of
   said inverter,
a plurality of second electronic switches disposed on the
   second portion of said base and electrically connected
   between the input and the output of said inverter, and
a heat pipe assembly,
wherein said inverter is structured to provide a single,
   three-phase output structure,
wherein the input of said active front end converter is
   structured to receive a medium voltage, and
wherein said adjustable frequency drive is cantilevered
   from an end of a chiller, without increasing a height of
   said adjustable frequency drive.

2. The adjustable frequency drive of claim 1 wherein said plurality of capacitors are disposed beside said plurality of second electronic switches, in order to reduce the height of said adjustable frequency drive.

3. The adjustable frequency drive of claim 2 wherein the height of said adjustable frequency drive is less than about 55 inches.

4. The adjustable frequency drive of claim 1 wherein an input section is electrically connected to and mounted remote from the input of said active front end converter.

5. The adjustable frequency drive of claim 4 wherein said input section comprises the series combination of an input isolation switch, a power fuse and a contactor.

6. The adjustable frequency drive of claim 4 wherein said input section is mounted in an enclosure remote from said adjustable frequency drive.

7. The adjustable frequency drive of claim 1 wherein said adjustable frequency drive provides a low profile structure.

8. The adjustable frequency drive of claim 1 wherein a filter is electrically connected to and mounted remote from the input of said active front end converter.

9. An adjustable frequency drive comprising:
a base including a first portion and a second portion;
a converter disposed on said base, said converter comprising:
   an input,
   an output, and
   a plurality of rectifiers disposed between said input and said output; and
an inverter disposed on said base, said inverter comprising:
   an input electrically connected to the output of said converter,
   an output,
   a plurality of capacitors disposed on the first portion of said base and electrically connected to the input of said inverter,
   a plurality of electronic switches disposed on the second portion of said base and electrically connected between the input and the output of said inverter, and
   a heat pipe assembly,
   wherein said inverter is structured to provide a single, three-phase output structure,
   wherein the input of said converter is structured to receive a medium voltage, and
   wherein said adjustable frequency drive is cantilevered from an end of a chiller, without increasing a height of said adjustable frequency drive.

10. The adjustable frequency drive of claim 9 wherein said plurality of capacitors are disposed beside said plurality of electronic switches, in order to reduce the height of said adjustable frequency drive.

11. The adjustable frequency drive of claim 10 wherein the height of said adjustable frequency drive is less than about 55 inches.

12. The adjustable frequency drive of claim 9 wherein a transformer is electrically interconnected with and mounted remote from the input of said converter.

13. The adjustable frequency drive of claim 12 wherein an input section is electrically connected to said transformer and mounted remote from the input of said converter.

14. The adjustable frequency drive of claim 13 wherein said input section comprises the series combination of an input isolation switch, a power fuse and a contactor.

15. The adjustable frequency drive of claim 13 wherein said input section is mounted in an enclosure remote from said adjustable frequency drive.

16. The adjustable frequency drive of claim 9 wherein said adjustable frequency drive provides a low profile structure.

17. The adjustable frequency drive of claim 9 wherein said electronic switches are IGBTs.

18. A system comprising:
a rotating electrical apparatus; and
an adjustable frequency drive integrally mounted with said rotating electrical apparatus, said adjustable frequency drive comprising:
   a base including a first portion and a second portion,
   an active front end converter disposed on said base, said active front end converter comprising:
      an input,
      an output, and
      a plurality of first electronic switches electrically connected between said input and said output, and
   an inverter disposed on said base, said inverter comprising:
      an input electrically connected to the output of said active front end converter,
      an output,
      a plurality of capacitors disposed on the first portion of said base and electrically connected to the input of said inverter,
      a plurality of second electronic switches disposed on the second portion of said base and electrically connected between the input and the output of said inverter, and
   a heat pipe assembly,
   wherein said inverter is structured to provide a single, three-phase output structure,
   wherein said rotating electrical apparatus forms a chiller having an end,
   wherein the input of said active front end converter is structured to receive a medium voltage, and
   wherein said adjustable frequency drive is cantilevered from the end of said chiller, without increasing a height of said system.

19. A system comprising:
a rotating electrical apparatus; and
an adjustable frequency drive integrally mounted with said rotating electrical apparatus, said adjustable frequency drive comprising:
   a base including a first portion and a second portion,
   a converter disposed on said base, said converter comprising:
      an input,
      an output, and a plurality of rectifiers disposed between said input and said output, and an inverter disposed on said base, said inverter comprising:

an input electrically connected to the output of said converter, an output, a plurality of capacitors disposed on the first portion of said base and electrically connected to the input of said inverter, a plurality of electronic switches disposed on the second portion of said base and electrically connected between the input and the output of said inverter, and a heat pipe assembly, wherein said inverter is structured to provide a single, three-phase output structure, wherein said rotating electrical apparatus forms a chiller having an end, wherein the input of said converter is structured to receive a medium voltage, and wherein said adjustable frequency drive is cantilevered from the end of said chiller, without increasing a height of said system.

* * * * *